US012605776B2

(12) United States Patent
     Ciurana De Arcos et al.

(10) Patent No.: US 12,605,776 B2
(45) Date of Patent: Apr. 21, 2026

(54) MILLING TOOL FOR SEATING A SCREW IN A DENTAL STRUCTURE

(71) Applicant: Paragon Tools, S.L., Barcelona (ES)

(72) Inventors: Isaac Ciurana De Arcos, Barcelona (ES); Roberto González Cegarra, Barcelona (ES)

(73) Assignee: Paragon Tools, S.L., Barcelona (ES)

( * ) Notice: Subject to any disclaimer, the term of this patent is extended or adjusted under 35 U.S.C. 154(b) by 721 days.

(21) Appl. No.: 17/428,642

(22) PCT Filed: Aug. 7, 2019

(86) PCT No.: PCT/ES2019/070554
     § 371 (c)(1),
     (2) Date: Aug. 5, 2021

(87) PCT Pub. No.: WO2020/161367
     PCT Pub. Date: Aug. 13, 2020

(65) Prior Publication Data
     US 2022/0016722 A1      Jan. 20, 2022

(30) Foreign Application Priority Data
     Feb. 5, 2019    (ES) ................................... 201930189

(51) Int. Cl.
     B23C 5/10          (2006.01)
     *A61C 8/00*          (2006.01)
(52) U.S. Cl.
     CPC ............. B23C 5/10 (2013.01); *A61C 8/0068* (2013.01); *A61C 8/0089* (2013.01)
(58) Field of Classification Search
     CPC ....... B23C 2210/242; B23C 5/10; B23C 5/12; B23C 5/14; B23C 5/1054; B23C 5/1063; B23B 51/102
     See application file for complete search history.

(56) References Cited

U.S. PATENT DOCUMENTS 5,964,555 A * 10/1999 Strand ................. B23B 31/1122
                                                       279/93
7,431,538 B1 * 10/2008 Ni ............................ B23C 5/10
                                                       407/53
(Continued)

FOREIGN PATENT DOCUMENTS

DE         10227574 A1 * 4/2004 ............... B23C 5/08
WO   WO 2007/113812      10/2007
(Continued)

OTHER PUBLICATIONS

International Search Report and the Written Opinion Dated Nov. 26, 2019 From the International Searching Authority Re. Application No. PCT/ES2019/070554. (12 Pages).

*Primary Examiner* — Sunil K Singh
*Assistant Examiner* — Eric Daniel Whitmire

(57)                ABSTRACT

The invention relates to a milling tool for seating a screw in a dental structure, the screw being provided to be joined to a dental implant, wherein the tool comprises a coupling region provided for coupling to a milling machine and a working region defined by a rod that on one end supports a head having a plurality of cutting blades radially distributed with respect to a longitudinal axis of the coupling region, wherein each cutting blade has a lower cutting surface. Said lower cutting surface has a region with a convex curvature which has a radius that varies between a maximum and a minimum value, the maximum value of the radius being equal to 0.1350*Dh, wherein Dh corresponds to the diameter of the effective area of the milling tool, and the minimum value of the radius complying with the formula:

$$R_{min} = 125\frac{\sqrt{2}\cdot 0.0012Dh}{3.2}$$

2 Claims, 5 Drawing Sheets

(56)                  References Cited

U.S. PATENT DOCUMENTS

| | | | |
|---|---|---|---|
| 2004/0035001 A1 * | 2/2004 | Jager ......................... | B23C 5/08 |
| | | | 29/894.33 |
| 2009/0252564 A1 | 10/2009 | Volokh et al. | |
| 2016/0250695 A1 | 9/2016 | Baba | |
| 2017/0304909 A1 | 10/2017 | Fukata | |

FOREIGN PATENT DOCUMENTS

| | | | | |
|---|---|---|---|---|
| WO | WO 2018/130730 | 7/2018 | | |
| WO | WO-2018130730 A1 * | 7/2018 | ............ | A61C 13/00 |
| WO | WO 2020/161367 | 8/2020 | | |

* cited by examiner

MILLING TOOL FOR SEATING A SCREW IN A DENTAL STRUCTURE

RELATED APPLICATIONS

This application is a National Phase of PCT Patent Application No. PCT/ES2019/070554 having International filing date of Aug. 7, 2019, which claims the benefit of priority of Spanish Patent Application No. U201930189 filed on Feb. 5, 2019. The contents of the above applications are all incorporated by reference as if fully set forth herein in their entirety.

FIELD AND BACKGROUND OF THE INVENTION

The object of the present application is to register a milling tool for seating a screw in a dental structure.

More specifically, the invention proposes the development of a milling tool for seating a screw in a dental structure, and as such, the invention is designed for the field of dental implants.

The aim of a dental implant system is to reestablish the normal functions of comfort, appearance, speech and health for a patient, regardless of the oral condition they may have. These implant systems are based on the placement of dental implants, by means of insertion into the mandible of the patient. The dental prosthesis can be fixed to these implants by means of a screw that passes through the prosthesis by means of a channel for the insertion of a screw element.

When the channel for the insertion of the screw element does not have a rectilinear trajectory, meaning the longitudinal axis of the channel is not linear for the entire path thereof, a specialized milling tool is used for machining the screw seat in the insertion channel. In the current state of the art, a milling tool with a generally T-shaped transverse cross section comprising a coupling region provided for coupling to a milling machine and a working region defined by a rod that on one end supports a plurality of cutting blades radially distributed with respect to a longitudinal axis of the coupling region, wherein each cutting blade has a lower cutting surface, is known. In these types of T-shaped tools, the lower cutting surface forms the screw seat, thereby making it necessary to use a different tool for each angle of the seat and screw measurement.

To work correctly, the milling tool enters through the exit hole of the screw, in other words, the hole of the channel for the screw closest to the implant-crown interface. The majority of implant manufacturers make this hole with a measurement equal to the size of the screw plus an additional space for safety, which is usually 10% of the value of the size, at most, and thus, for the calculation, the diameter of the effective area of the tool is, at most, 1.05 times the size of the screw.

The fact of having a larger diameter of the effective area (Dh) implies greater risk of collision due to variables that are difficult to control, such as the manufacturing tolerance of the milling tool, operating precision, vibrations of the milling tool during the operation thereof or the bending of the tool during the rotational movement thereof.

It is important to mention that for the calculation, the diameter of the rod of the tool (Dt) (see FIG. 1) will be, as a minimum, 10% the diameter of the effective area (Dh) of the milling tool. A smaller diameter would not be viable since, on the one hand, a significant degree of bending is produced during the rotation of the milling tool and, on the other hand, a rod less than 10% of the Dh would be too fragile to withstand the stress and bending and torque momentum produced during the use of the tool.

The screws commonly used for dental implants, and which are usually introduced in channels that do not usually have a rectilinear trajectory as would be desired, are comprised between the sizes of 1.4 and 2.5 mm, with a maximum ratio of 0.60, as can be seen in the following table where the following maximum ration M/Dc is obtained (Dc being the diameter of the screw head) for the different size values commonly used:

| Size | Maximum M/Dc ratio |
|------|--------------------|
| M 1.4 | 0.60 |
| M 1.6 | 0.67 |
| M 1.8 | 0.71 |
| M 2 | 0.75 |
| M 2.5 | 0.74 |

Moreover, the contact surfaces between the screw and the seat cannot be machined without roughness. This roughness on the contact surfaces can be smoothed out during the loading, thereby causing a preload loss of the screw of between 2 and 10% with conventional machining conditions, this preload loss being directly related to the roughness of the screw seat. Thus, the surface roughness must be the lowest possible within the manufacturing limits.

There is a minimum radius of the milling tool below which it is no longer effective, due to the fact that a radius that is too small will make it so the surface roughness of the screw seat being milled is not suitable, with the consequence being that the screw becomes loosened, even though the surface roughness can be altered by modifying the cutting conditions. However, modifying the cutting conditions can lead to a series of drawbacks, such as an excessively long milling time, thereby increasing costs, and on the other hand, cutting conditions for the tool that are far from ideal could cause premature wear of the same.

Furthermore, the applicant does not currently know of an invention that has all the features described in this specification.

SUMMARY OF THE INVENTION

The present invention has been developed with the aim of providing a tool which is configured as a novelty within the field of application and solves the previously mentioned drawbacks, also contributing other additional advantages that will be obvious from the description below.

An object of the invention is therefore to provide a milling tool for seating a screw in a dental structure, the screw being provided to be joined to a dental implant, wherein the tool comprises a coupling region provided for coupling to a milling machine and a working region defined by a rod that on one end supports a head having a plurality of cutting blades radially distributed with respect to a longitudinal axis of the coupling region, wherein each cutting blade has a lower cutting surface.

Specifically, the invention is characterized by the fact that the lower cutting surface has a region with a convex curvature having a radius that varies between a maximum and minimum value, the maximum value of the radius being equal to 0.1350*Dh, wherein Dh corresponds to the diameter of the effective area of the milling tool, and the minimum value of the radius complying with the formula:

$$R_{min} = 125 \frac{\sqrt{2} \cdot 0.0012Dh}{3.2}$$

It is important to mention that the diameter of the effective area of the milling tool will correspond to the diameter, in a plan view, defined by the cutting blades, as indicated in FIG. 1.

It must be taken into account that Df (the diameter of the channel of the screw) is at least equal to Dc plus two times the radius of the lower cutting surface, and as such Df:

$$Df=M-Dt+Dh$$

Thanks to these features, a working tool envisaged to be viable in a large number of cases is achieved, due to the fact that it allows different seat angles (with a different seat angle) to be machined, without having to use a different milling tool for each screw with a different seat and/or size. Normally, a screw is linked to a type or size of dental implant.

This minimum radius of the lower cutting zone allows an acceptable manufacturing roughness to be obtained, while, on the other hand, defining a maximum radius is determined by the fact that, above a determined value, and considering the commercial dimensions of the screws for implants, it would not be possible to mill a seat big enough in order for the screw to be able to be properly seated.

The minimum radius is less than 0.1350*Dh.

For the minimum radius, it has been taken into consideration that for milling machines of this scale, the standard values of the radial and axial depth of cut for carrying out the milling of Cobalt and Titanium alloys is usually 5-10% of the diameter of the milling tool, the minimum acceptable values being around 0.12% the diameter of the effective area of the tool (Dh).

It is also preferable that the working region of the milling tool of the invention comprise between two and six cutting blades.

Therefore, the milling tool described represents an innovative structure with structural and constituent features heretofore unknown for its intended purpose, reasons which, taken together with its usefulness, provide it with sufficient grounds for obtaining the requested exclusivity privilege.

Other features and advantages of the milling tool object of the present invention will become apparent from the description of a preferred but not exclusive embodiment illustrated by way of non-limiting example in the attached drawings, in which:

DESCRIPTION OF SPECIFIC EMBODIMENTS OF THE INVENTION

In light of the aforementioned figures, and in accordance with the adopted numbering, one may observe therein an example of a preferred embodiment of the invention, which comprises the parts and elements indicated and described in detail below.

Figure 1:
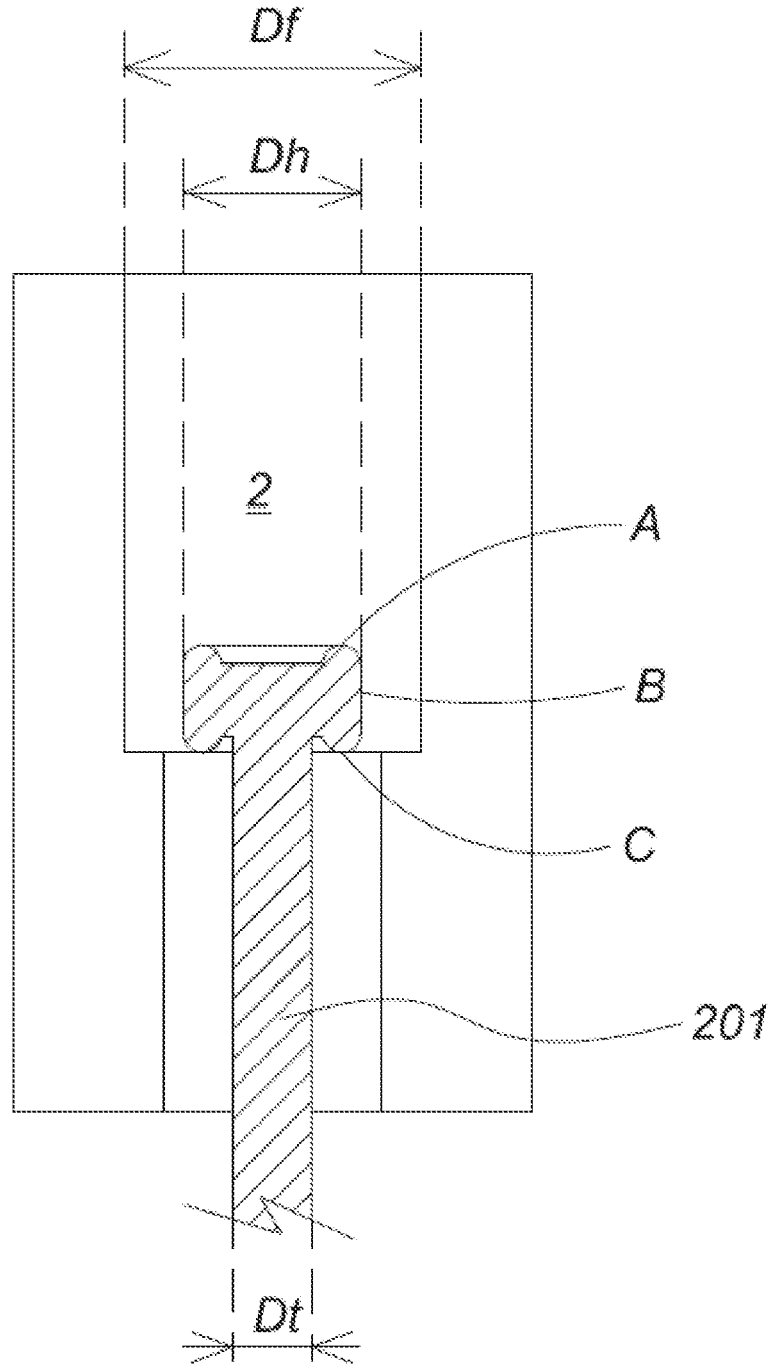
FIG. 1 is a schematic elevation view of the arrangement of a milling tool according to the present invention in a channel for the arrangement of a screw element for dental implants.
Figure 2:
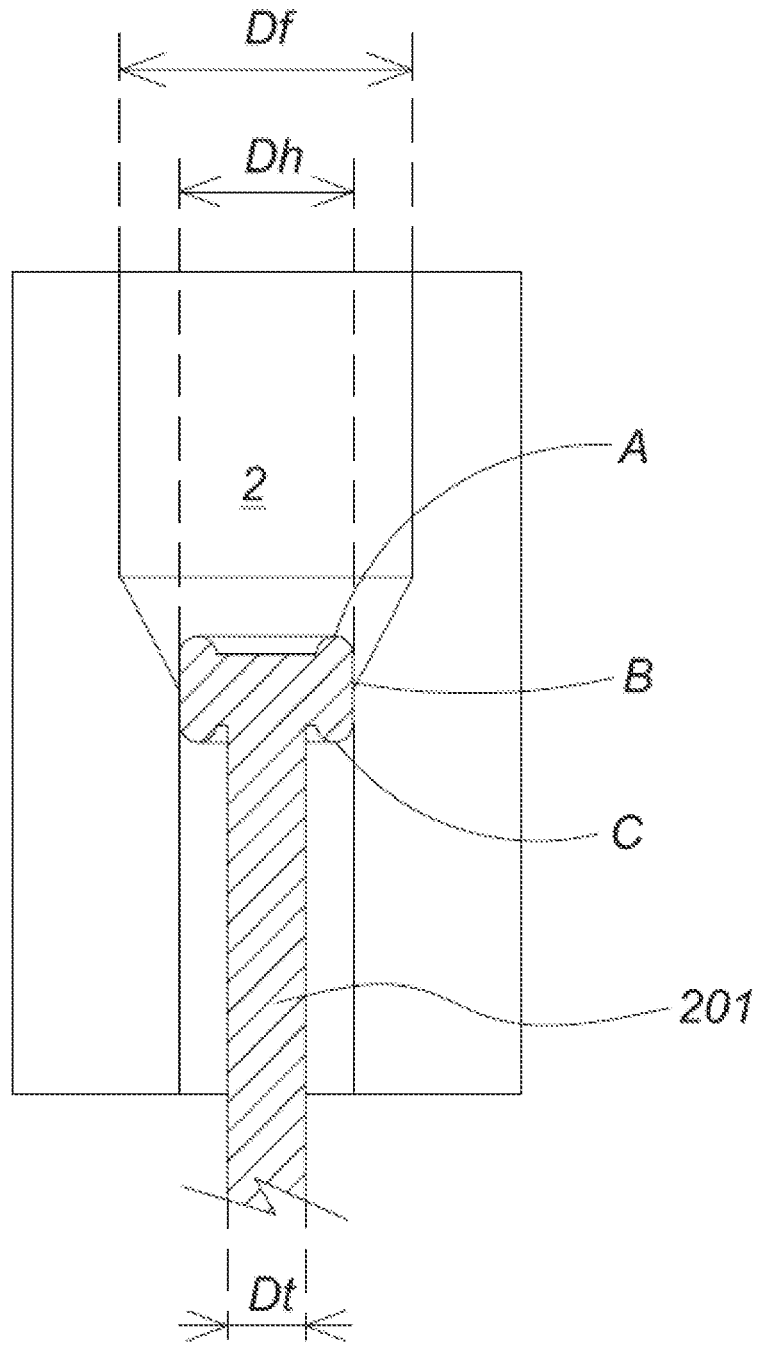
FIG. 2 is a schematic elevation view of the arrangement of a milling tool according to the present invention in a channel for the arrangement of a screw element for dental implants, with the channel having a frustoconical intermediate cross section.
Figure 4:
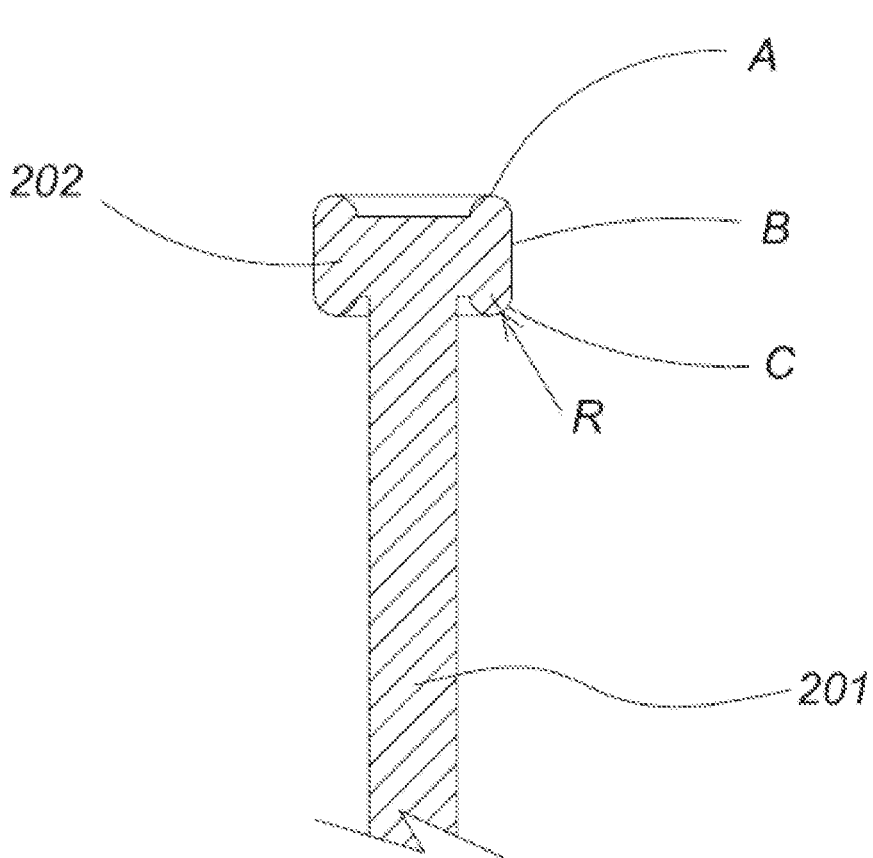
FIG. 4 is an expanded elevation view of the working region of the milling tool.
Figure 5:
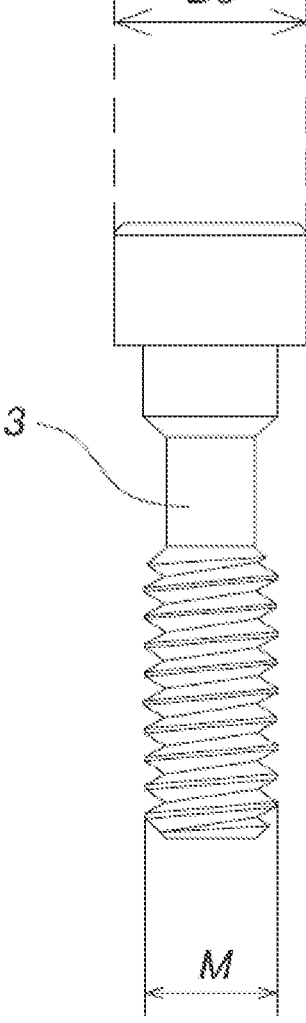
FIG. 5 is an elevation view of a screw for dental implants.
Figure 6:
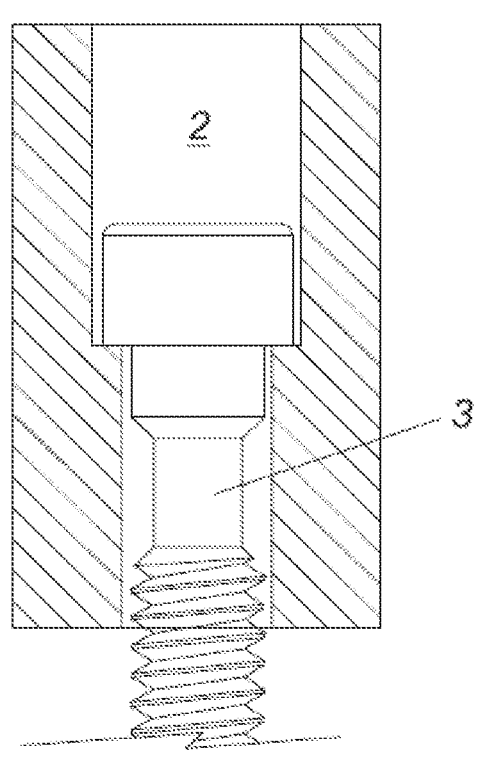
FIG. 6 is a schematic elevation view of the arrangement of the screw inside the channel.

As can be seen, an embodiment of the milling tool, generally indicated with the reference (1), is provided for seating a screw (3) in a dental structure, which has a size comprised between 1.4 and 2.5 mm. In particular, the tool (1) essentially comprises a coupling region (10) provided for coupling to a milling machine and a working region (20) which is defined by a rod (201) which on one end supports a head that has a plurality of cutting blades (202) radially distributed with respect to a longitudinal axis of the coupling region, wherein each one of the cutting blades (202) has upper cutting surfaces (A), lateral cutting surfaces (B) and lower cutting surfaces (C), as indicated in FIGS. 1, 2 and 4.

Figure 3:
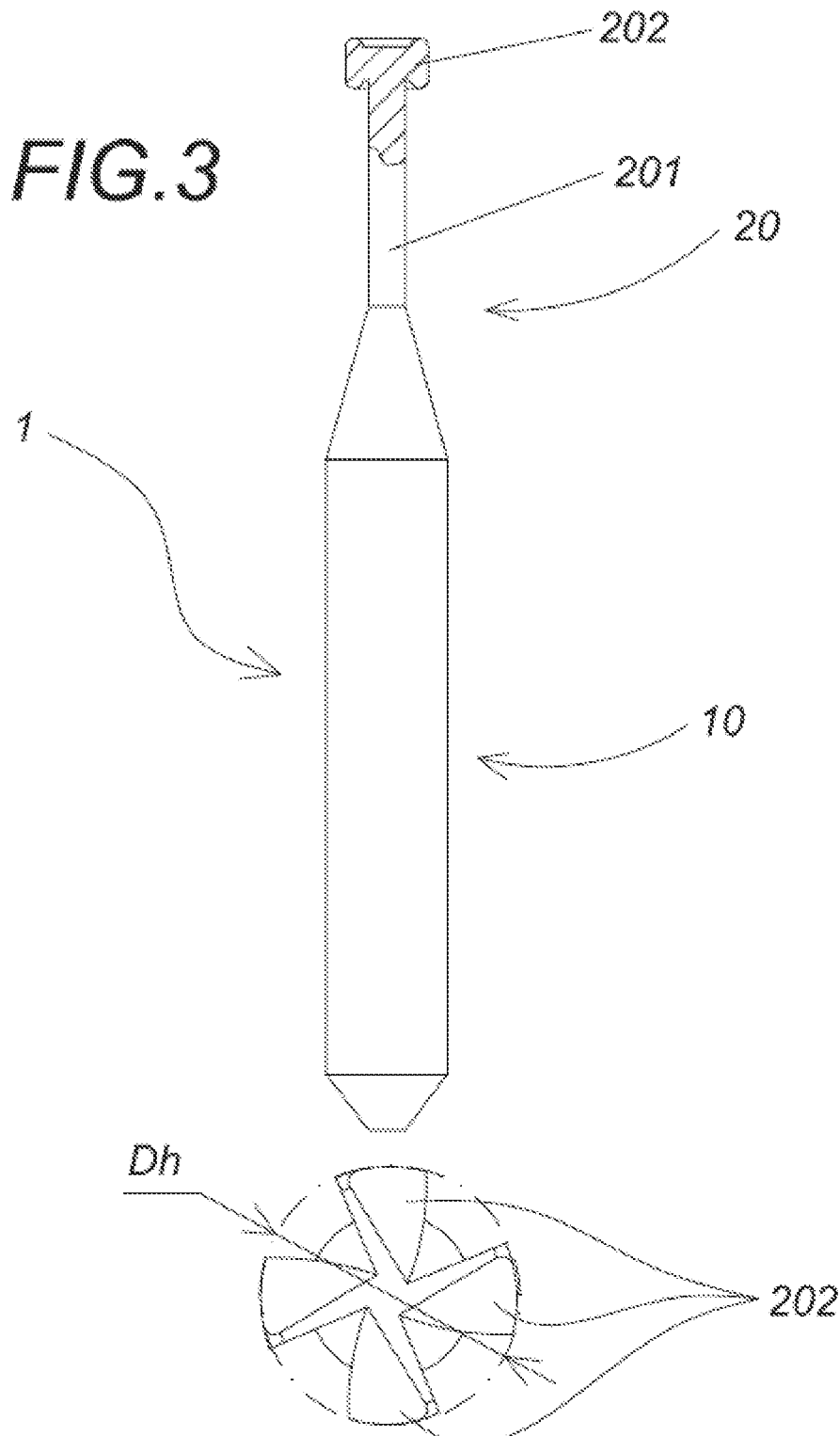
FIG. 3 is an elevation view and plan view of the tool according to the invention.

In the embodiment shown, the working region (20) comprises four radially distributed cutting blades (202), as can be seen in FIG. 3.

In reference to the lower cutting surface (C), in a profile view, the same has a region with a convex curvature which has a radius (R) that varies between a maximum and a minimum value, the maximum value of the radius being equal to 0.1350*Dh, wherein Dh corresponds to the diameter of the effective area of the milling tool.

On the other hand, the minimum value in millimeters of the radius (also called minimum radius) must comply with the following formula:

$$R_{min} = 125 \frac{\sqrt{2} \cdot 0.0012Dh}{3.2}$$

Based on the foregoing description, a table is provided with a ratio between the diameter of the effective area of the milling tool comprised between 1.4 and 2.5 mm and the maximum and minimum radius admissible for the milling machine described herein:

| Dh (mm) | Rmax (mm) | Rmin (mm) |
|---|---|---|
| 1.4 | 0.189 | 0.093 |
| 1.6 | 0.216 | 0.106 |
| 1.8 | 0.243 | 0.119 |
| 2 | 0.270 | 0.133 |
| 2.5 | 0.338 | 0.166 |

The details, shapes, dimensions and other complementary elements used to manufacture the tool of the invention may be suitably replaced with others that do not depart from the scope defined by the claims below.

REFERENCES

Dc: diameter of the screw head
Df: diameter of the screw channel
Dt: diameter of the rod of the milling machine Dh: diameter of the effective area of the milling machine

1: milling tool

10 coupling region

20 working region

201 rod

202 cutting blades

R radius of the lower cutting surface

M size

2 channel

3 screw

A upper cutting surface

B lateral cutting surface

C lower cutting surface

The invention claimed is:

1. A milling tool for seating a screw in a dental structure, the screw being provided to be joined to a dental implant, wherein the milling tool comprises:

a coupling region provided for coupling to a milling machine and a working region defined by a rod of diameter Dt that on one end supports a head having a plurality of cutting blades radially distributed with respect to a longitudinal axis of the coupling region, the cutting blades comprising a distal end portion and a proximal end portion in respect of the rod, wherein the milling tool having a T-shaped transverse cross section, wherein each cutting blade has an upper cutting surface arranged at the distal end portion of the cutting blade, a lower cutting surface arranged at the proximal end portion of the cutting blade and a lateral cutting surface extending between the upper cutting surface and the lower cutting surface, wherein the lower cutting surface has a region with a convex curvature extending between the lateral cutting surface and the rod, the convex curvature being defined by a radius that varies between a maximum and a minimum value, the maximum value of the radius being equal to 0.1350*Dh, wherein Dh corresponds to the diameter of the effective area of the milling tool, and the minimum value of the radius complying with the formula:

$$R_{min} = 125 \frac{\sqrt{2} \cdot 0.0012 Dh}{3.2}$$

wherein the convex curvature is configured to define a sector that subtends an angle of 180° such that a semicircular curvature protruding from the proximal end portion of the cutting blade is defined; and wherein Dh corresponds to the diameter, in a plan view, defined by the cutting blades, and wherein Dh>Dt.

2. The milling tool according to claim 1, wherein the working region comprises between two and six cutting blades.

* * * * *